April 7, 1964 R. H. SKIDMORE Re. 25,547

PREDETERMINED TORQUE RELEASE WRENCH

Original Filed June 17, 1959

INVENTOR.
RICHARD H. SKIDMORE

BY

Meyer, Baldwin, Dam & Young
ATTORNEYS

United States Patent Office

Re. 25,547
Reissued Apr. 7, 1964

25,547

PREDETERMINED TORQUE RELEASE WRENCH

Richard H. Skidmore, Lyndhurst, Ohio, assignor to Skidmore-Hungerford Industries, Inc., Bedford Heights, Ohio, a corporation of Ohio Original No. 2,959,078, dated Nov. 8, 1960, Ser. No. 820,977, June 17, 1959. Application for reissue Oct. 29, 1962, Ser. No. 234,582
6 Claims. (Cl. 81—52.4)

Matter enclosed in heavy brackets [ ] appears in the original patent but forms no part of this reissue specification; matter printed in italics indicates the additions made by reissue.

This invention relates to improvements in a wrench and more particularly to an adjustable torque wrench.

One of the objects of the present invention is to provide a torque wrench having a roller type follower engaging its camming surface with a rolling contact to minimize friction.

A further object of the present invention is to provide a torque wrench having a pin-type roller bearing rotatably mounting this roller follower.

A further object of the present invention is to provide a torque wrench having flat camming surface portions engaging a follower in both initial and tripped positions.

A further object of the present invention is to provide a torque wrench providing an audible signal during movement between initial and tripped positions in response to application of a predetermined torque.

A further object of the present invention is to provide a torque wrench automatically movable in the reverse direction back from the tripped position to the initial position upon release of the applied torque.

A further object of the present invention is to provide a torque wrench characterized by its accurate adjustment, compact size, light weight, economical construction, simplicity of design, rugged construction, ease of assembly of its component parts, and ease of use.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 1 is a side elevational view of the adjustable torque wrench disclosed herein;

FIG. 2 is a longitudinal section taken along the line 2—2 in FIG. 1;

FIG. 3 is an enlargement of a portion of FIG. 2 of the roller follower and its mounting member; while FIG. 4 is an enlarged longitudinal sectional view taken generally along the line 4—4 in FIG. 2 with the relative positions of roller and camming surface shown with respect to the other parts of the wrench in solid line for initial position and in dot-dash line for actuated position.

Figures 1, 2, 3, 4:
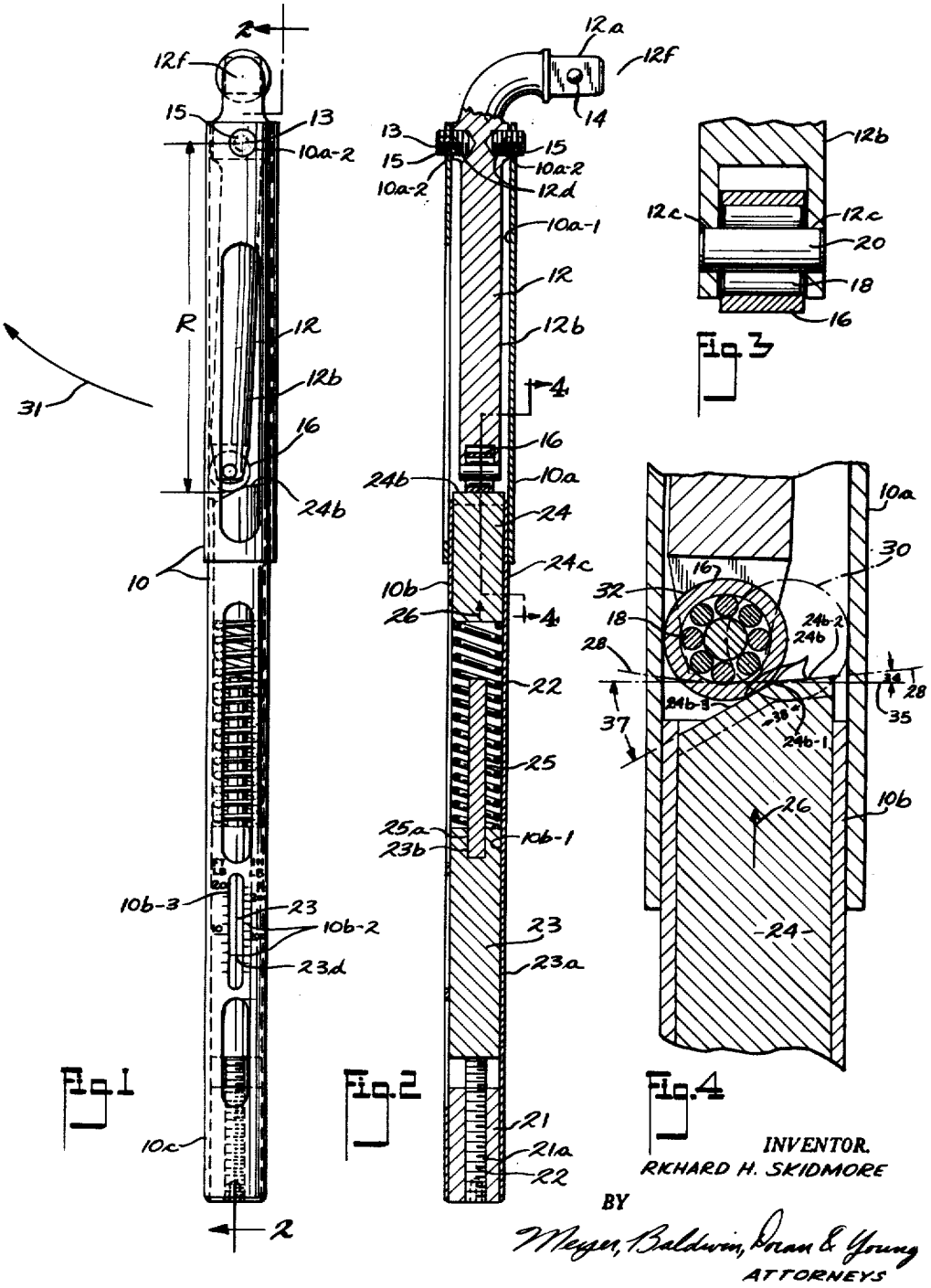

Before the torque wrench here illustrated is specifically described, it is to be understood that the invention here involved is not limited to the structural details or arrangement of parts here shown since a torque wrench embodying the present invention may take various forms. It also is to be understood that the phraseology or terminology herein employed is for purposes of description and not of limitation since the scope of the present invention is denoted by the appended claims.

Those familiar with this art will recognize that my invention may be applied in many ways, but it has been chosen to illustrate the same as an adjustable torque wrench.

Cylindrical housing 10 provides the casing for the wrench with this housing including an upper part 10a and lower part 10b with each part being tubular. These parts are illustrated in the drawings as being telescopically assembled and have coaxial, cylindrical bores 10a–1 and 10b–1.

These housing parts 10a and 10b are secured in assembled relationship in any suitable manner, such as by a drive or force fit, welded joint, screw threads, etc.

Upper part 10a has a work-engaging member or lever 12 connected thereto by pivot 13. The upper end of lever 12 is arranged to engage a bolt to be tightened. Here the end is bent laterally at 90° and has a square projecting portion or work-engaging portion 12a with conventional spring pressed ball 14 in a hole thereof adapted to grip a square, female hole in a socket or ratchet having on its opposite end a coaxial male or female portion adapted to engage in a recessed bolt head or over a conventional bolt head or nut. Tang 12b of lever 12 on the opposite side of pivot 13 from portion 12a may have any suitable follower thereon but preferably a roller-type follower 16 rotatably mounted by a needle-type roller bearing 18 on an axle 20 secured at opposite ends in coaxial holes 12c in tang 12b.

Pivot 13 operatively connects member 12 to housing 10 for relative movement of follower 16 and housing 10 through an arcuate path 28 in FIG. 4 about pivot 13. Pivot 13 includes screws 15 screwed into coaxial tapped holes 12d in member 12 and having their heads rotatably mounted in coaxial holes 10a–2 in housing parts 10a.

Lower part 10b has plug 21 fixed therein in any suitable manner, such as by a force fit, welding, or screw threads, with this plug having a screw threaded bore 21a within which an Allen head screw 22 is screwed. The upper end of screw 22 presses against the lower end of member 23 having a cylindrical surface 23a telescopically movable in bore 10b–1; and carrying rod 25 coaxial with cylindrical surface 23a with rod 25 having a knurled surface 25a held by a press fit in bore 23b of member 23. Hence, rotation of screw 22 is adapted to move member 23 telescopically and axially within bore 10b–1. Block 24 has a cylindrical periphery 24c axially movable in bore 10b–1 of housing 10 and a camming surface 24b. A suitable resilient means, such as compression spring 22, is laterally centered by bore 10b–1 and biases block 24 in upward direction 26 within housing 10.

The mode of operation should now be generally apparent. When the socket or ratchet on square projection portion 12a is engaged with a nut or bolt head, housing 10 is held by the hand portion 10c to turn the wrench and the nut or bolt head in the tightening or clockwise direction 31 in FIG. 1 about axis 12f by applying torque by the torque wrench to the nut or bolt. As a predetermined work-engaging force or torque is applied by the wrench to the nut or bolt through surface 24b and roller 16, relative movement takes place between roller follower 16 and the assembly including block 24 and housing 10 from initial position 32 in FIG. 4 to tripped position 30 with FIG. 4 showing the relative position of roller 16 and surface 24b with respect to the rest of the wrench in these two respective positions in solid line and dot-dash lines. Although roller follower 16 is shown in two different positions for simplicity of illustration, it should be readily understood that the actual movement takes place by having housing 10 moved with respect to roller follower 16 between these positions since the increased torque advances housing 10 in direction 31 with respect to member 12 held against further movement by the nut or bolt being tightened. However, FIG. 4 still shows the relative position between roller 16 and cam surface 24b and the rest of the parts in the wrench with the tripped or one position 30 shown in dot-dash line position and the other or initial position shown in solid line. During movement between these positions, the different portions of housing 10 each move through one of a series of arcuate paths 28 centered at pivot 13 and extending generally transverse to the direction 26 in which block 24 is biased by spring 22. Hence, when this predetermined torque is applied, this tendency to move from initial position 32 to trip position 30 is resisted by the compressive force of spring 22 pushing block 24 in direction 26, but this predetermined torque causes roller follower 16 to push cam surface 24b in the downward direction opposite the direction 26 so that the parts can move to the tripped position 30 with roller 16 rolling uphill on block surface 24b during this movement between these positions.

Cam surface 24b includes sharp shoulder 24b–1 at the intersection of two angularly related, flat portions 24b–2 and 24b–3 respectively engaged by roller 16 to determine the positions with one portion 24b–2 determining one position 30 and other portion 24b–3 determining the other position 32. Arcuate path 28 has been drawn in contact with surface 24b in FIG. 4 at shoulder 24b–1 between portions 24b–2 and 24b–3; and reference plane 35 has been drawn tangent to arc 28, through shoulder 24b–1, and perpendicular to direction 26. These portions 24b–2 and 24b–3 meet at common shoulder 24b–1 and are generally opposite each other with respect to shoulder 24b–1, and are inclined in the same direction with respect to path 28, namely upwardly and toward the right in FIG. 4. One portion 24b–2 extends generally parallel to path 28 by being inclined by angle 34 approximately 6 to 8 degrees with respect to plane 35, and is located above or on the follower side of path 28 as is apparent by comparing angle 34 with path 28 in FIG. 4. Other portion 24b–3 is located on the opposite side of or below path 28 and is inclined at an angle 37 of preferably approximately not under 25 degrees and not over 35 degrees with respect to plane 35. *Thus the included angle between portions 24b–2 and 24b–3 will be between approximately 151° and 163°.* It should be noted that portion 24b–2 is angularly inclined less steeply with respect to path 28 and plane 35 than portion 24b–3; the surface of roller 16 engages surface portion 24b–2 in position 30; and the surface of this roller engages surface portion 24b–3 in position 32 with the engagement in this last position preferably being held to 1/32 inch but not greater than 1/16 inch from shoulder 24b–1, as shown by dimension 38. *In the full-line normal or no torque position of FIG. 4, flat cam portion 24b–3 is tangent to roller 16. In the dot-dash line position of FIG. 4, flat cam portion 24b–2 is tangent to roller 16.* These aforementioned preferred angles and dimensions are for a torque wrench radius swing dimension R in FIG. 1 of about three inches, but will also be satisfactory for a dimension R of about 12 inches.

As the predetermined torque is applied and the parts move from initial position 32 to tripped position 30, roller 16 travels over shoulder 24b–1 and engages housing 10a so as to emit an audible click to indicate that the bolt or nut has been tightened with the predetermined torque desired.

Upon release of this torque or force, spring 22 will cause the parts to return to the initial position 32 by causing roller 16 to roll downhill on cam surface 24b. Start of this return action is assured by a proper angle 34 so that surface portion 24b diverges upwardly in FIG. 4 from arcuate path 28. Therefore, with a larger dimension R, path 28 is flatter and a smaller angle 34 may be used satisfactorily. When dimension R is 12 inches, angle 34 may be 5 degrees. However, satisfactory results have been obtained with angle 34 at 7½ degrees with dimension R of three or twelve inches.

A minimum of sliding friction exists in this torque wrench because roller 16, rotatable with minimum friction by needle bearing 18, has roller contact on flat portions 24b–2 and 24b–3. This construction requires less particularity in design and manufacture and is easier to operate than a ball, other type follower, or other type camming surfaces.

The torque wrench is adjustable for any predetermined torque desired because the force required for moving the parts between initial position 32 and tripped position 30 may be adjusted. First, during assembly, the relative axial location of housing parts 10a and 10b in final assembly will determine the preloading on spring 22 so as to establish the range of adjustment. Second, within this range, the torque wrench may be adjusted by rotating screw 22 in either of two opposite directions so as to move member 23 in direction 26 or in the opposite axial direction so as to increase or decrease the axial loading on spring 22. Indicator mark 23d on block member 23 is adapted to be read in FIG. 1 through opening 10b–3 of part 10b and may be calibrated with respect to indicator marks 10b–2 on housing part 10b as a visual indication of the relative axial position of member 23 with respect to housing 10, the axial force exerted on block 24 by spring 22 in direction 26, and the predetermined torque required to move the parts from position 32 to position 30.

I believe one of the advantages of my torque wrench over those of the prior art is illustrated when one compares the torque developed with progressive increments of movement of the handle or housing 10. With the first movement of the parts from the condition shown in FIG. 4, the roller 16 starts to climb the cam surface 24b–3 with the result that there is a sudden increase of torque from zero to maximum, and then just as the roller passes the sharp shoulder 24b–1, the torque falls off suddenly and sharply to a fairly constant level indicated by the effect of the cam surface 24b–2 on the roller 16 tending to move it clockwise or in the return direction as shown in FIG. 4. This sudden release of torque as the roller 16 passes the sharp shoulder 24b–1 causes the hand of the operator to suddenly carry the parts to the dot-dash position indicated at 30 in FIG. 4 with a loud snap as the roller 16 strikes the housing part 10a. To the best of my knowledge and belief, no prior art devices does this but, instead, as the device passes the peak of the torque developed, the torque falls off more gradually than in my device so that there is not such a clear indication that the desired limit has been reached.

The upper end of rod 25 in FIG. 2 is adapted to axially engage against the lower end of block 24 during axial relative approach movement of blocks 23 and 24 to prevent spring 22 from going into "solid" height beyond the adjustment of the wrench.

Various changes in details and arrangement of parts can be made by one skilled in the art without departing from either the spirit of this invention or the scope of the appended claims.

What is claimed is:

1. In a predetermined torque release wrench of the class having a housing, a block movable in said housing, resilient means biasing said block to move in said housing in one direction extending perpendicular to a reference plane, a work-engaging member having a *roller* follower engaging a surface on said block for restricting block movement in said one direction, and means operatively connecting said member to said housing for relative movement of said follower and housing through a path generally transverse to said one direction from one position to another position, said block surface having two flat portions respectively engaged by said follower to determine said positions, *each of said flat portions being tangent to said roller follower respectively in said positions,* said block surface having one of said portions extending generally parallel to said path and having the other of said portions extending from said one portion away from said follower and approximately inclined 25 to 35 degrees with respect to said reference plane.

2. In a predetermined torque release wrench, as set forth in claim 1, *wherein said flat portions meet at a shoulder, said reference plane passes through said shoulder, and* with said one portion being inclined approximately 5 to 8 degrees with respect to said reference plane *on the side of said reference plane opposite said other portions.* [, said one portion being on the follower side of said path and said other portion being on the opposite side of said path.]

3. In a predetermined torque release wrench of the class having a housing, a block movable in said housing, resilient means biasing said block to move in one direction in said housing, a work-engaging member having a roller follower engaging a surface on said block for restricting block movement in said one direction, and means operatively connecting said member to said housing for relative movement of said follower and housing through a path generally transverse to said one direction from [one] a predetermined torque position to *a normal* [another] position, said block surface having two flat portions respectively engaged by said follower to determine said positions, *each of said flat portions being tangent to said roller follower respectively in said positions,* said block surface having said two portions angularly related *at an included angle between approximately 151° and 163°* and connected by a shoulder so that movement of said member between said positions carries said follower over said shoulder.

4. In a predetermined torque release wrench, as set forth in claim 3, *in* [with] *that* one of said portions *engaged in predetermined torque position* being angularly inclined less steeply with respect to said path than the other of said portions, said follower engaging said other portion in one of said positions a distance no greater than 1/16 inch from said shoulder.

[5. In a predetermined torque release wrench of the class having a housing, a block movable in said housing, resilient means biasing said block to move in one direction in said housing, a work-engaging member having a follower engaging a surface on said block for restricting block movement in said one direction, and means operatively connecting said member to said housing for relative movement of said follower and housing through a path generally transverse to said one direction from one position to another position, said follower being a roller rotatably mounted by a needle-type roller bearing on said member with said roller being adapted to roll on said block surface during movement between said positions.]

6. In a predetermined torque release wrench, a housing, a block movable in said housing, resilient means biasing said block to move in one direction in said housing, a work-engaging member having a *roller* follower engaging a surface on said block for restricting block movement in said one direction, and means operatively connecting said member to said housing for relative movement of said follower and housing through a path generally transverse to said one direction from [one] *a normal* position to *a predetermined torque* [another] position, said block surface having two flat portions respectively engaged by said follower to determine said positions with portions of said housing, *each of said flat portions being tangent to said roller follower respectively in said positions,* said block portions meeting at a common shoulder with both block portions being inclined in the same direction with respect to said path with one block portion located on the *predetermined torque portion* [follower side] of said path and the other block portion located on the [opposite side] *normal position portion* of said path, [said follower engaging said one block portion in said one position,] said block portions being inclined with respect to said path *with an included angle between said portions between approximately 151° and 163°* so that a predetermined work-engaging force applied through said surface and follower will cause movement from said *normal position* [other] to said *predetermined torque* [one] position against the bias of said resilient means while emitting an audible click by said follower striking *said housing* [one of said portions] in said [one] *predetermined torque* position and so that release of said force will cause movement back from said [one to other] *predetermined torque position to said normal* position by the bias of said resilient means urging said block in said one direction toward said follower.

*7. In a predetermined torque release wrench of the class having a housing, a block member in said housing and having two flat surface portions angularly related at an included angle between approximately 151° and 163° and connected by a shoulder, a roller follower member in said housing and adapted to travel over said block surface portions, one of said members being movably mounted in said housing for movement toward and away from the other of said members in one direction, the other of said members having connections with said housing and with a work-engaging member for movement by the latter through a path generally transverse to said one direction and sufficient to cause rolling of said follower member along said flat surface portions on opposite sides of said shoulder, each of said flat portions being tangent to said roller follower respectively in said positions, and resilient means operatively associated with said block and follower members for urging them toward each other, the block surface portion first engaged by said follower member, upon applying torque through said work-engaging member, being so constructed and arranged that relative movement between said block and follower member stresses said resilient means, whereby the change of position of said follower member between surface portions of said block member on opposite sides of said shoulder occurs with a snap.*

References Cited in the file of this patent or the original patent

UNITED STATES PATENTS

| | | |
|---|---|---|
| 2,365,486 | Morris | Dec. 19, 1944 |
| 2,704,472 | Booth | Mar. 22, 1955 |
| 2,731,865 | Woods | Jan. 24, 1956 |
| 2,732,747 | Livermont | Jan. 31, 1956 |
| 2,743,638 | Woods | May 1, 1956 |
| 2,887,919 | Aijala | May 26, 1959 |
| 2,887,921 | Livermont | May 26, 1959 |
| 2,899,854 | Livermont | Aug. 18, 1959 |
| 2,918,834 | Cranford | Dec. 29, 1959 |

FOREIGN PATENTS

| | | |
|---|---|---|
| 1,063,803 | France | Dec. 23, 1953 |